(12) United States Patent
Kuehner et al.

(10) Patent No.: US 12,172,664 B2
(45) Date of Patent: Dec. 24, 2024

(54) AIDING AN INDIVIDUAL TO CAUSE A VEHICLE TO MAKE A TURN CORRECTLY

(71) Applicant: Woven by Toyota, Inc., Tokyo (JP)

(72) Inventors: Manuel Ludwig Kuehner, Mountain View, CA (US); Hiroshi Yasuda, San Francisco, CA (US)

(73) Assignee: Woven by Toyota, Inc., Tokyo (JP)

(*) Notice: Subject to any disclaimer, the term of this patent is extended or adjusted under 35 U.S.C. 154(b) by 83 days.

(21) Appl. No.: 18/097,584

(22) Filed: Jan. 17, 2023

(65) Prior Publication Data

US 2024/0239361 A1    Jul. 18, 2024

(51) Int. Cl.
| | |
|---|---|
| *B60W 50/14* | (2020.01) |
| *B60Q 1/50* | (2006.01) |
| *B60W 40/08* | (2012.01) |

(52) U.S. Cl.
CPC ............ *B60W 50/14* (2013.01); *B60Q 1/50* (2013.01); *B60W 40/08* (2013.01); *B60Q 2400/50* (2013.01); *B60W 2050/146* (2013.01); *B60W 2420/403* (2013.01); *B60W 2540/225* (2020.02); *B60W 2555/60* (2020.02)

(58) Field of Classification Search
CPC ............ B60W 50/14; B60W 40/08; B60W 2050/146; B60W 2420/403; B60W 2540/225; B60W 2555/60; B60Q 1/50; B60Q 2400/50
See application file for complete search history.

(56) References Cited

U.S. PATENT DOCUMENTS

| | | | |
|---|---|---|---|
| 9,889,876 B2 | 2/2018 | Russell et al. | |
| 2008/0198372 A1 | 8/2008 | Pan | |
| 2017/0341580 A1* | 11/2017 | Okuda | B60Q 9/008 |
| 2019/0376798 A1* | 12/2019 | Abramson | G01C 21/3641 |

(Continued)

FOREIGN PATENT DOCUMENTS

CN    106062852 A    10/2016

OTHER PUBLICATIONS

Song et al., "Enhancing GPS with Lane-level Navigation to Facilitate Highway Driving," IEEE Transactions on Vehicular Technology, vol. 66, No. 6, Jun. 2017, pp. 4579-4591.

(Continued)

*Primary Examiner* — Mohamed Barakat
(74) *Attorney, Agent, or Firm* — Christopher G. Darrow; Darrow Mustafa PC

(57) ABSTRACT

A system for aiding an individual to cause a vehicle to make a turn correctly can include a processor and a memory. The memory can store a communications module and a controller module. The communications module can cause the processor to obtain information about a specific side of a road on which the vehicle is to be operated. The communications module can cause the processor to obtain information about a degree of familiarity of the individual in operating the vehicle on the specific side. The communications module can cause the processor to obtain information about a direction of the turn. The controller module can cause the processor to cause, in response to the degree of familiarity being less than a threshold and based on the information about the direction, a visual aid to be possibly presented to aid the individual to cause the vehicle to make the turn correctly.

20 Claims, 5 Drawing Sheets

(56) References Cited

U.S. PATENT DOCUMENTS

| | | | | |
|---|---|---|---|---|
| 2020/0001875 | A1* | 1/2020 | Kato | G01C 21/3602 |
| 2021/0153796 | A1 | 5/2021 | De Weser et al. | |
| 2021/0155242 | A1* | 5/2021 | Taniguchi | B60W 50/10 |
| 2021/0192975 | A1* | 6/2021 | Spence | G01C 21/365 |
| 2022/0306145 | A1* | 9/2022 | Komikawa | B60W 30/182 |

OTHER PUBLICATIONS

Tran et al., "A Left-Turn Driving Aid Using Projected Oncoming Vehicle Paths with Augmented Reality," Proceedings of the 5th International Conference on Automotive User Interfaces and Interactive Vehicular Applications, 2013, pp. 300-307.

Cheng et al., "An Application of Augmented Reality Head-Up Display," Automotive Research & Testing Center, vol. 6, pp. 1-9.

Thompson et al., "Allocation of attention in familiar and unfamiliar traffic scenarios," Transportation Research Part F: Traffic Psychology and Behaviour, vol. 55, May 2018, pp. 188-198.

Liono et al., "Detecting passenger discomfort from abnormal driving manoeuvres," 23rd ITS World Congress, Melbourne, Australia, Oct. 2016, pp. 1-12.

Wynne et al., "You look familiar: Learner driver hazard identification on familiar and unfamiliar roads," Proceedings of the Human Factors and Ergonomics Society Annual Meeting, vol. 63, 2019, pp. 2001-2005.

Naqvi et al., "Deep Learning-Based Gaze Detection System for Automobile Drivers Using a NIR Camera Sensor," Sensors, vol. 18, No. 2, 2018, pp. 456-489.

Unknown, "Spatial light modulator," last accessed on Jul. 19, 2022, 3 pages, found at https://en.wikipedia.org/wiki/Spatial_light_modulator.

Unknown, "Digital Light: Millions of Pixels on the Road," Jun. 20, 2022, 8 pages, found at https://www.al.world/ hews/article/digital-light-millions-of-pixels-on-the-road/.

Andrew Krok, "Mercedes' wild new headlights project an HD image onto the road," CNET, Dec. 2, 2016, 3 pages.

Collin Woodard, "New Maybach Headlights can Project Images on the Road," Motortrend, Mar. 5, 2018, 5 pages.

Unknown, "Head-up display," last accessed on Nov. 27, 2022, 14 pages, found at https://en.wikipedia.org/wiki/Head-up_display.

Whitney Russell, "How Do Head-Up Displays Work?" The News Wheel, Jun. 30, 2021, 4 pages, found at https://thenewswheel.com/how-do-head-up-displays-work/8254473980_7673f0f37a_k/.

Unknown, "How does head-up display work?" Mar. 13, 2018, 7 pages, found at https://www.hyundai.news/eu/articles/stories/how-does-head-up-display-work.html#:~:text=A.

Unknown, "Understanding the Heads-Up Display," Mar. 9, 2021, 4 pages, found at https://www.trueblueautoglass.com/how-does-a-heads-up-display-work/.

Unknown, "What Are Holographic Head Up Displays," MAT Europe, last accessed on Dec. 23, 2022, 6 pages, found at https://www.matfoundrygroup.com/blog/What_Are_Holographic_Head_Up_Displays.

Blake Z. Rong, "What is HUD?" Nov. 22, 2016, 7 pages, found at https://www.roadandtrack.com/about/a31240/how-does-a-heads-up-display-work/.

Kim et al. "Development of an Active Front Steering System," International Journal of Automotive Technology, vol. 7, No. 3, 2006, pp. 315-320.

Geng et al., "ANFTS Mode Control for an Electronically Controlled Hydraulic Power Steering System on a Permanent Magnet Slip Clutch," Energies, vol. 12, No. 9, pp. 1739-1760, 2019.

Mia Bevacqua, "How Does Power Steering Work? (With Example Diagrams)" 7 pages, last accessed on Nov. 29, 2022, found at https://www.carparts.com/blog/how-does-power-steering-work-with-example-diagrams/.

Andrew Markel, "Variable Ratio Steering Systems," Jun. 29, 2020, 3 pages, found at https://www.tomorrowstechnician.com/variable-ratio-steering-systems/.

Unknown, "Active steering," 3 pages, last accessed on Jan. 31, 2022, found at https://en.wikipedia.org/wiki/Active_steering.

Unknown, "Drive by wire," 4 pages, last accessed on Jan. 17, 2022, found at https://en.wikipedia.org/wiki/Drive_by_wire.

Unknown, "Power steering," 7 pages, last accessed on Sep. 29, 2022, found at https://en.wikipedia.org/wiki/Power_steering.

Unknown, "Steering ratio," 2 pages, last accessed on Nov. 2, 2022, found at https://en.wikipedia.org/wiki/Steering_ratio.

\* cited by examiner

AIDING AN INDIVIDUAL TO CAUSE A VEHICLE TO MAKE A TURN CORRECTLY

TECHNICAL FIELD

The disclosed technologies are directed to aiding an individual to cause a vehicle to make a turn correctly.

BACKGROUND

Regulations that govern travel on many roads can provide that movement of vehicles, pedestrians, and other conveyances along such roads be confined to two streams of traffic that flow in opposite directions. Such traffic can be referred to as bidirectional traffic. Such regulations can dictate a specific side of a road (e.g., either left or right) to which traffic is to adhere. Such regulations can be promulgated by regimes (e.g., countries). For historic and other reasons, specific regimes can have selected one side of the road (e.g., left (right)) as the specific side of the road to which traffic is to adhere. Traffic in regimes that have selected the left side of the road as the specific side of the road to which traffic is to adhere can be referred to as left-hand traffic. Likewise, traffic in regimes that have selected the right side of the road as the specific side of the road to which traffic is to adhere can be referred to as right-hand traffic. An individual that regularly operates a vehicle in a right-hand (left-hand) traffic regime may have a high degree of familiarity in operating the vehicle on the right (left) side of the road. However, if this individual has spent little time operating a vehicle in a left-hand (right-hand) traffic regime, this individual may have a low degree of familiarity in operating the vehicle on the left (right) side of the road. Such a low degree of familiarity can be particularly problematic at a time at which this individual is operating the vehicle at an intersection with an intent to cause the vehicle to make a turn from a first road to a second road.

SUMMARY

In an embodiment, a system for aiding an individual to cause a vehicle to make a turn correctly can include a processor and a memory. The memory can store a communications module and a controller module. The communications module can include instructions that, when executed by the processor, cause the processor to obtain information about a specific side of a road on which the vehicle is to be operated. The communications module can include instructions that, when executed by the processor, cause the processor to obtain information about a degree of familiarity of the individual in operating the vehicle on the specific side. The communications module can include instructions that, when executed by the processor, cause the processor to obtain information about a direction of the turn. The controller module can include instructions that, when executed by the processor, cause the processor to cause, in response to the degree of familiarity being less than a threshold and based on the information about the direction, a visual aid to be possibly presented to aid the individual to cause the vehicle to make the turn correctly.

In another embodiment, a method for aiding an individual to cause a vehicle to make a turn correctly can include obtaining, by a processor, information about a specific side of a road on which the vehicle is to be operated. The method can include obtaining, by the processor, information about a degree of familiarity of the individual in operating the vehicle on the specific side. The method can include obtaining, by the processor, information about a direction of the turn. The method can include causing, by the processor and in response to the degree of familiarity being less than a threshold and based on the information about the direction, a visual aid to be possibly presented to aid the individual to cause the vehicle to make the turn correctly.

In another embodiment, a non-transitory computer-readable medium for aiding an individual to cause a vehicle to make a turn correctly can include instructions that, when executed by one or more processors, cause the one or more processors to obtain information about a specific side of a road on which the vehicle is to be operated. The non-transitory computer-readable medium can also include instructions that, when executed by one or more processors, cause the one or more processors to obtain information about a degree of familiarity of the individual in operating the vehicle on the specific side. The non-transitory computer-readable medium can also include instructions that, when executed by one or more processors, cause the one or more processors to obtain information about a direction of the turn. The non-transitory computer-readable medium can also include instructions that, when executed by one or more processors, cause the one or more processors to cause, in response to the degree of familiarity being less than a threshold and based on the information about the direction, a visual aid to be possibly presented to aid the individual to cause the vehicle to make the turn correctly.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The disclosed technologies are directed to aiding an individual to cause a vehicle to make a turn correctly. Information about a specific side (e.g., left (right)) of a road on which the vehicle is to be operated can be obtained. Information about a degree of familiarity of the individual in operating the vehicle on the specific side (e.g., left (right)) can be obtained. Information about a direction of the turn (e.g., left (right)) can be obtained. In response to the degree of familiarity being less than a threshold and based on the information about the direction of the turn, a visual aid can be possibly presented to aid the individual to cause the vehicle to make the turn correctly. For example, when a vehicle makes a right turn in a left-hand traffic regime, making the turn correctly can involve making a wide turn from a left lane of a first road to a left lane of a second road so that a result of such a turn has the vehicle in a lane in which traffic flows in a direction consistent with an orientation of the vehicle at an end of the turn. In contrast, making the turn incorrectly may involve making a tight turn from the left lane of the first road to a right lane of the second road so that a result of such a turn has the vehicle in a lane in which traffic flows in a direction opposite of the orientation of the vehicle at the end of the turn (i.e., into oncoming traffic). A presentation of the visual aid may prevent making such a turn incorrectly.

For example, the visual aid can actually be presented. For example, the visual aid can be an image projected in front of the vehicle. Additionally or alternatively, the visual aid can be an image projected to a display region. For example, the display region can be one or more of a combiner of a head-up display system, a portion of a windshield of the vehicle, a volume of space in front of the individual operating the vehicle, or the like. For example, the combiner can be a screen attached to a dashboard of the vehicle and designated for displaying images produced by the head-up display system. For example, the portion of the windshield can include transparent phosphors for use in displaying images produced by the head-up display system. For example, the visual aid can include an arrow pointed in the direction of the turn, an animation of a car making the turn correctly, or the like. For example, the animation of the car making the turn correctly can be presented in a continuous loop.

Figure 1:
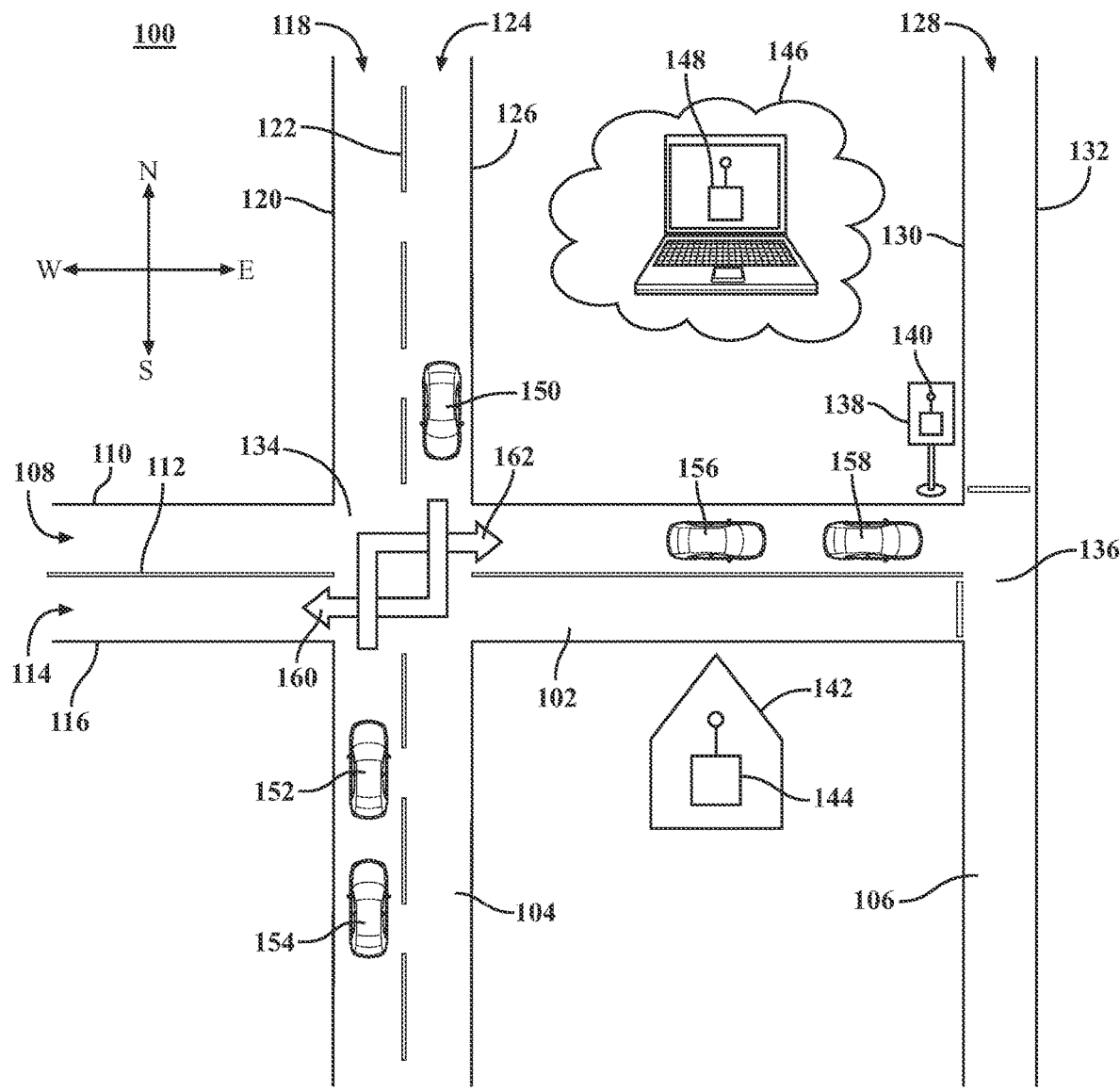
FIG. 1 includes a diagram that illustrates an example of an environment for aiding an individual to cause a vehicle to make a turn correctly, according to the disclosed technologies.

FIG. 1 includes a diagram that illustrates an example of an environment 100 for aiding an individual to cause a vehicle to make a turn correctly, according to the disclosed technologies. For example, the environment 100 can be within the United Kingdom, a regime with left-hand traffic. The environment 100 can include Buckingham Street 102 (disposed along a line of latitude), Anglo Avenue 104 (disposed along a line of longitude), and Saxon Lane 106 (disposed along a line of longitude, cast of Anglo Avenue 104).

For example, Buckingham Street 102 can include a lane #1 108 (for eastbound traffic). For example, the lane #1 108 can be bounded on the north by a lane marking 110. Lane marking 110 can be a type of lane marking that indicates an edge of a road. For example, the lane #1 108 can be bounded on the south by a lane marking 112. Lane marking 112 can be a type of lane marking that indicates a separation between lanes in which streams of traffic flow in opposite directions. For example, Buckingham Street 102 can include a lane #1 114 (for westbound traffic). For example, the lane #1 114 can be bounded on the north by the lane marking 112. For example, the lane #1 114 can be bounded on the south by a lane marking 116. Lane marking 116 can be the type of lane marking that indicates an edge of a road.

For example, Anglo Avenue 104 can include a lane #1 118 (for northbound traffic). For example, the lane #1 118 can be bounded on the west by a lane marking 120. Lane marking 120 can be the type of lane marking that indicates an edge of a road. For example, the lane #1 118 can be bounded on the east by a lane marking 122. Lane marking 122 can be the type of lane marking that indicates a separation between lanes in which streams of traffic flow in opposite directions. For example, Anglo Avenue 104 can include a lane #1 124 (for southbound traffic). For example, the lane #1 124 can be bounded on the west by the lane marking 122. For example, the lane #1 124 can be bounded on the east by a lane marking 126. Lane marking 126 can be the type of lane marking that indicates an edge of a road.

For example, Saxon Lane 106 can include a lane #1 128 (for southbound traffic). For example, the lane #1 128 can be bounded on the west by a lane marking 130. Lane marking 130 can be the type of lane marking that indicates an edge of a road. For example, the lane #1 128 can be bounded on the cast by a lane marking 132. Lane marking 132 can be a type of lane marking that indicates an edge of a road.

For example, a first intersection 134 can be formed by Buckingham Street 102 and Anglo Avenue 104. For example, a second intersection 136 can be formed by Buckingham Street 102 and Saxon Lane 106.

For example, the environment 100 can include, at a northwest corner of the second intersection 136, a roadside unit 138. For example, the roadside unit 138 can include a communications device 140.

For example, the environment 100 can include a building 142. For example, a communications device 144 can be located within the building 142.

For example, the environment 100 can include a cloud computing platform 146. For example, the cloud computing platform 146 can include a communications device 148.

For example, the environment 100 can include a first vehicle 150, a second vehicle 152, a third vehicle 154, a fourth vehicle 156, and a fifth vehicle 158. For example, the first vehicle 150 can be located in the lane #1 124 about five meters north of the first intersection 134. For example, the second vehicle 152 can be located in the lane #1 118 about five meters south of the first intersection 134. For example, the third vehicle 154 can be located in the lane #1 118 about fifteen meters south of the first intersection 134 and five meters south of the second vehicle 152. For example, the fourth vehicle 156 can be located in the lane #1 108 between the first intersection 134 and the second intersection 136. For example, the fifth vehicle 158 can be located in the lane #1 108 about five meters west of the second intersection 136.

For example, the environment 100 can be associated with an event, in the United Kingdom, which includes Audrey, Brigitte, Charlotte, Dorit, and Esmeralda. Audrey is from the United States, a regime with right-hand traffic, and this is her first visit to a regime with left-hand traffic. Audrey believes that she has a low degree of familiarity in operating a vehicle in a regime with left-hand traffic. Audrey is operating the first vehicle 150. Brigitte is from France, a regime with right-hand traffic, and she frequently visits the United Kingdom. Brigitte believes that she has a high degree of familiarity in operating a vehicle in a regime with left-hand traffic. Brigitte is operating the second vehicle 152. Charlotte is from the United Kingdom, a regime with left-hand traffic. Charlotte believes that she has a high degree of familiarity in operating a vehicle in a regime with left-hand traffic. Charlotte is operating the fourth vehicle 156. Dorit is from Germany, a regime with right-hand traffic, and she has visited the United Kingdom twice before this event. Dorit believes that she has a reasonable degree of familiarity in operating a vehicle in a regime with left-hand traffic. Dorit is operating the third vehicle 154. Esmeralda is from Spain, a regime with right-hand traffic, and this is her first visit to a regime with left-hand traffic. Esmeralda believes that she has a low degree of familiarity in operating a vehicle in a regime with left-hand traffic. Esmeralda is operating the fifth vehicle 158.

Figure 2:
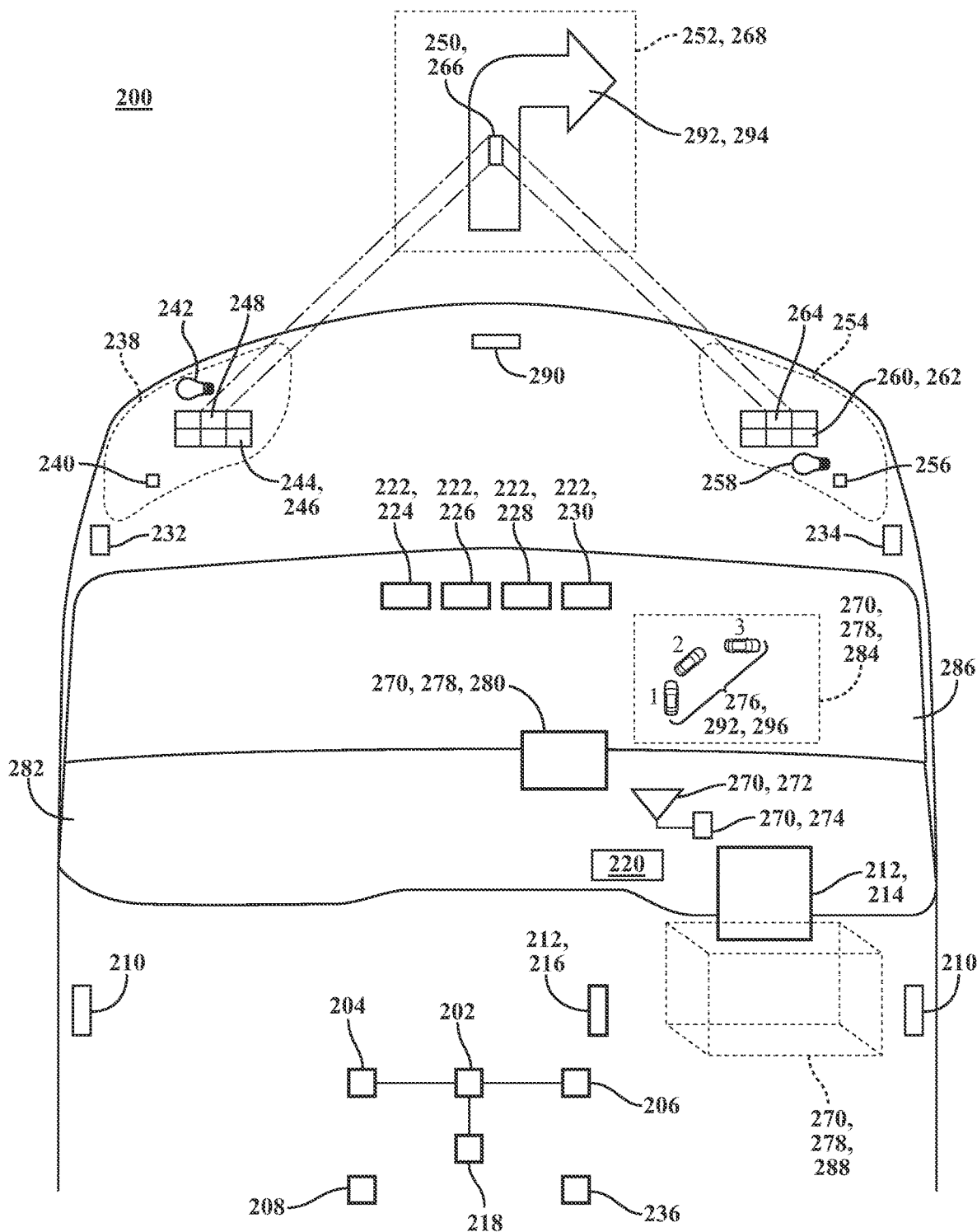
FIG. 2 includes a diagram that illustrates an example of a vehicle in which an individual can be aided to cause the vehicle to make a turn correctly, according to the disclosed technologies.

FIG. 2 includes a diagram that illustrates an example of a vehicle 200 in which an individual can be aided to cause the vehicle 200 to make a turn correctly, according to the disclosed technologies. For example, one or more of the first vehicle 150, the second vehicle 152, the third vehicle 154, the fourth vehicle 156, or the fifth vehicle 158 illustrated in FIG. 1 can be the vehicle 200. The vehicle 200 can include, for example, a processor 202 and a memory 204. The memory 204 can be communicably coupled to the processor 202.

Additionally, for example, the vehicle 200 can include a communications device 206. The communications device 206 can be communicably coupled to the processor 202.

Additionally, for example, the vehicle 200 can include a sensor 208 configured to determine a current location of the vehicle 200. For example, the sensor 208 can be a Global Navigation Satellite System (GNSS) sensor.

Additionally, for example, the vehicle 200 can include a sensor 210 configured to detect a lane marking that indicates a side of a road at which the vehicle 200 is located. For example, the sensor 210 can be a side-facing camera.

Additionally, for example, the vehicle 200 can include a steering operator interface 212. In a first example 214, the steering operator interface 212 can be a steering wheel, a handlebar, a twin lever steering interface, or the like. In a second example 216, the steering operator interface 212 can be a joystick-like control lever or the like.

Additionally, for example, the vehicle 200 can include a data store 218. The data store 218 can be communicably coupled to the processor 202. For example, the data store 218 can store data indicative of a side (e.g., left or right) of the vehicle 200 at which the steering operator interface 212 is disposed.

Additionally, for example, the vehicle 200 can include a user interface 220. For example, the user interface 220 can be configured to receive information from an individual who is, has, or will be operating the vehicle 200.

Additionally, for example, the vehicle 200 can include a sensor 222 configured to obtain information indicative of a cognitive state of an individual operating the vehicle 200. For example, the sensor 222 can be one or more of a gaze-tracking system 224, a still image camera 226, a video camera 228, an infrared camera 230, or the like.

Additionally, for example, the vehicle 200 can include a left turn signal device 232 and a right turn signal device 234.

Additionally, for example, the vehicle 200 can include a navigation system 236 configured to determine, for the vehicle 200, a route from an origination location to a destination location.

Additionally, for example, the vehicle 200 can include a headlamp system 238. For example, the headlamp system 238 can include a controller 240, a light source 242, and a digital micromirror device 244. For example, the digital micromirror device 244 can include an array 246 of micromirror elements. For example, the controller 240 can be configured to control a position of a micromirror element 248 of the array 246 so that, in response to having the micromirror element 248 illuminated by a light (e.g., from the light source 242), a reflection of the light from the micromirror element 248 forms a pixel 250 of an image 252 projected in front of the vehicle 200.

Additionally or alternatively, for example, the vehicle 200 can include a headlamp system 254. For example, the headlamp system 254 can include a controller 256, a light source 258, and a spatial light modulator 260. For example, the spatial light modulator 260 can include an array 262 of translucent elements. For example, the controller 256 can be configured to control a degree of translucence of a translucent element 264 of the array 262 so that, in response to having the translucent element 264 illuminated by a light (e.g., from the light source 258), a portion of the light, determined by the degree of translucence, passing through the translucent element 264 forms a pixel 266 of an image 268 projected in front of the vehicle 200.

Additionally or alternatively, for example, the vehicle 200 can include a head-up display system 270. For example, the head-up display system 270 can include a controller 272 and a projector 274. For example, the controller 272 can be configured to control an appearance of an image 276 to be projected by the projector 274 to a display region 278. Additionally, for example, the head-up display system 270 can include a combiner 280. For example, the combiner 280 can be a screen attached to a dashboard 282 of the vehicle 200 and designated for displaying images produced by the head-up display system 270. For example, the display region 278 can be the combiner 280. For example, the image 276 can have a two-dimensional form. Additionally or alternatively, for example, the display region 278 can be a portion 284 of a windshield 286 of the vehicle 200. For example, the portion 284 of the windshield 286 can include transparent phosphors for use in displaying images produced by the head-up display system 270. For example, the image 276 can have a two-dimensional form. Additionally or alternatively, for example, the display region 278 can be a volume of space 288 in front of the individual operating the vehicle 200. For example, the head-up display system 270 can be configured to produce images for an augmented reality environment. For example, the image 276 can have a three-dimensional form.

Additionally, for example, the vehicle 200 can include a sensor 290 configured to determine a distance between the vehicle 200 and an object in front of the vehicle 200. For example, the sensor 290 can be a ranging device. For example, the ranging device can be one or more of a radar device, a lidar device, an ultrasonic ranging device, an infrared ranging device, or the like.

Figure 3:
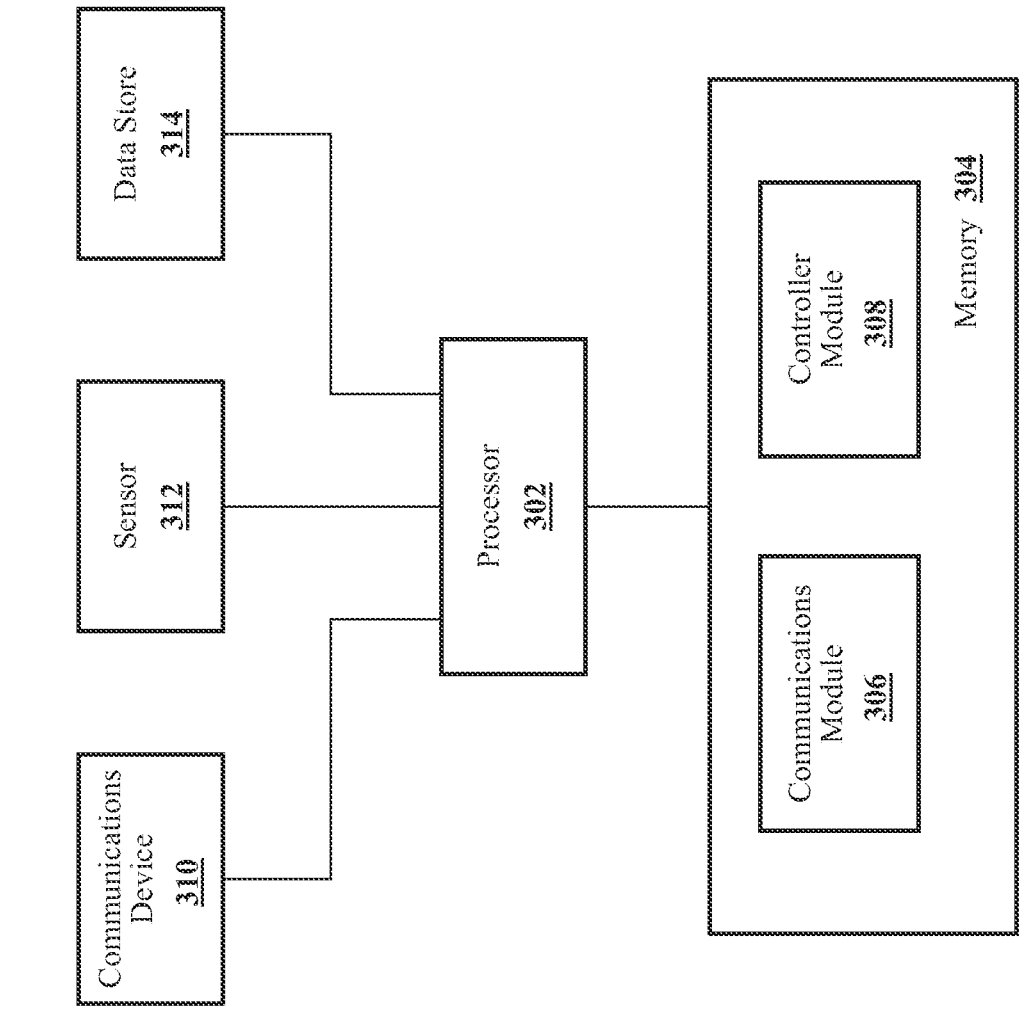
FIG. 3 includes a block diagram that illustrates an example of a system for aiding an individual to cause a vehicle to make a turn correctly, according to the disclosed technologies.

FIG. 3 includes a block diagram that illustrates an example of a system 300 for aiding an individual to cause a vehicle to make a turn correctly, according to the disclosed technologies. The system 300 can include, for example, a processor 302 and a memory 304. The memory 304 can be communicably coupled to the processor 302. For example, the memory 304 can store a communications module 306 and a controller module 308. For example, the system 300 can be disposed on a vehicle. For example, the vehicle can be the vehicle 200 illustrated in FIG. 2. For example, the processor 302 can be the processor 202 illustrated in FIG. 2. For example, the memory 304 can be the memory 204 illustrated in FIG. 2.

For example, the communications module 306 can include instructions that function to control the processor 302 to obtain information about a specific side of a road on which the vehicle is to be operated.

In an implementation, the system 300 can further include a communications device 310. The communications device 310 can be communicably coupled to the processor 302. For example, the communications device 310 can be the communications device 206 illustrated in FIG. 2. The instructions to obtain the information about the specific side of the road on which the vehicle is to be operated can include instructions to receive, via the communications device 310, a signal that includes the information about the specific side of the road on which the vehicle is to be operated.

With reference to FIGS. 1 and 2, for example, prior to operating the third vehicle 154 in the lane #1 118 about fifteen meters south of the first intersection 134, Dorit can have made arrangements with an entity to rent the third vehicle 154. For example, the entity can perform its business operations at the building 142. In conjunction with making arrangements with Dorit to rent the third vehicle 154, the entity can cause a signal, that includes information that the third vehicle 154 is going to be operated in a regime with left-hand traffic, to be communicated from the communications device 144 to the communications device 206 of the vehicle 200 (which can be the third vehicle 154). The vehicle 200 can receive, via the communications device 206, the signal that includes the information that the vehicle 200 is going to be operated in a regime with left-hand traffic and is to be operated on the left side of the road.

Returning to FIG. 3, additionally or alternatively, in another implementation, the system 300 can further include a sensor 312. The sensor 312 can be communicably coupled to the processor 302. For example, the sensor 312 can be the sensor 208 (e.g., a Global Navigation Satellite System (GNSS) sensor) illustrated in FIG. 2. The instructions to obtain the information about the specific side of the road on which the vehicle is to be operated can include instructions to: (1) determine, via the sensor 312, a current location of the vehicle and (2) determine, based on the current location of the vehicle, the specific side of the road on which the vehicle is to be operated. With reference to FIGS. 1 and 2, for example, the vehicle 200 can: (1) determine, via the sensor 208, that the current location of the vehicle 200 is within the United Kingdom and (2) determine, based on the current location of the vehicle 200 being within the United Kingdom, that the vehicle 200 is to be operated on the left side of the road.

Returning to FIG. 3, additionally or alternatively, in yet another implementation, the system 300 can further include the sensor 312. For example, the sensor 312 can be the sensor 210 (e.g., a side-facing camera) illustrated in FIG. 2. The instructions to obtain the information about the specific side of the road on which the vehicle is to be operated can include instructions to: (1) determine, via the sensor 312, a lane marking that indicates the specific side of the road on which the vehicle is to be operated and (2) determine, based on the lane marking, the specific side of the road on which the vehicle is to be operated. With reference to FIGS. 1 and 2, for example, the vehicle 200 (which can be the third vehicle 14) can: (1) determine, via one or more implementations of the sensor 210, one or more of the lane marking 120 or the lane marking 122 and (2) determine, based on the one or more of the lane marking 120 or the lane marking 122, that the vehicle 200 is to be operated on the left side of the road.

Returning to FIG. 3, additionally or alternatively, in still another implementation, the system 300 can further include a data store 314. The data store 314 can be communicably coupled to the processor 302. For example, the data store 314 can store data indicative of a side (e.g., left or right) of the vehicle at which a steering operator interface of the vehicle is disposed. For example, the data store 314 can be the data store 218 illustrated in FIG. 2. The instructions to obtain the information about the specific side of the road on which the vehicle is to be operated can include instructions to: (1) determine a side of the vehicle at which the steering operator interface is disposed and (2) determine, based on the side of the vehicle at which the steering operator interface is disposed, the specific side of the road on which the vehicle is to be operated. With reference to FIG. 2, for example, the vehicle 200 can: (1) determine that the steering operator interface 212 is located on the right side of the vehicle 200 and (2) determine, based on the steering operator interface 212 being located on the right side of the vehicle 200, that the vehicle 200 is to be operated on the left side of the road.

Returning to FIG. 3, for example, the communications module 306 can include instructions that function to control the processor 302 to obtain information about a degree of familiarity of the individual in operating the vehicle on the specific side.

In an implementation, the system 300 can further include the communications device 310. For example, the communications device 310 can be the communications device 206 illustrated in FIG. 2. The instructions to obtain the information about the degree of familiarity of the individual in operating the vehicle on the specific side can include instructions to receive, via the communications device 310, a signal that includes the information about the degree of familiarity of the individual in operating the vehicle on the specific side.

With reference to FIGS. 1 and 2, for example, prior to operating the third vehicle 154 in the lane #1 118, Dorit can have made arrangements with an entity to rent the third vehicle 154. In conjunction with making arrangements, Dorit can have communicated to the entity that she has a reasonable degree of familiarity in operating a vehicle in a regime with left-hand traffic. For example, the entity can perform its business operations at the building 142. In conjunction with making arrangements with Dorit to rent the third vehicle 154, the entity can cause a signal, that includes information that Dorit has a reasonable degree of familiarity in operating a vehicle on the left side of the road, to be communicated from the communications device 144 to the communications device 206 of the vehicle 200 (which can be the third vehicle 154.) The vehicle 200 can receive, via the communications device 206, the signal that includes the information that Dorit has a reasonable degree of familiarity in operating a vehicle on the left side of the road. Additionally or alternatively, for example, a profile of Dorit that includes historical information about her operations of vehicles can be stored by the cloud computing platform 146. The cloud computing platform 146 can cause at least some of the information included in the profile of Dorit, including the information that Dorit has a reasonable degree of familiarity in operating a vehicle on the left side of the road, to be communicated from the communications device 148 to the communications device 206 of the vehicle 200 (which can be the third vehicle 154). The vehicle 200 can receive, via the communications device 206, the signal that includes the information that Dorit has a reasonable degree of familiarity in operating a vehicle on the left side of the road.

Returning to FIG. 3, additionally or alternatively, in another implementation, the system 300 can be configured to be coupled to a user interface of the vehicle. The user interface can be communicably coupled to the processor 302. The user interface can be configured to receive information from an individual who is, has, or will be operating the vehicle. For example, the user interface can be the user interface 220 illustrated in FIG. 2. The instructions to obtain the information about the degree of familiarity of the individual in operating the vehicle on the specific side can include instructions to receive, via the user interface, a signal that includes the information about the degree of familiarity of the individual in operating the vehicle on the specific side. With reference to FIGS. 1 and 2, for example, the vehicle 200 (which can be the third vehicle 154) can receive, via the user interface 220, a signal that includes the information that Dorit has a reasonable degree of familiarity in operating a vehicle on the left side of the road.

Returning to FIG. 3, additionally or alternatively, in yet another implementation, the system 300 can further include the sensor 312. For example, the sensor 312 can be the sensor 222 (e.g., one or more of the gaze-tracking system 224, the still image camera 226, the video camera 228, the infrared camera 230, or the like) illustrated in FIG. 2. The instructions to obtain the information about the degree of familiarity of the individual in operating the vehicle on the specific side can include instructions to: (1) obtain, via the sensor 312, information indicative of a cognitive state of the individual and (2) determine, based on the information indicative of the cognitive state of the individual, the degree of familiarity of the individual in operating the vehicle on the specific side. The information indicative of the cognitive state of the individual can be produced at a time in which the vehicle was being operated on the specific side of the road.

With reference to FIGS. 1 and 2, for example, while operating the third vehicle 154 in the lane #1 118 about fifteen meters south of the first intersection 134, Dorit can exhibit physical manifestations indicative of her cognitive state with respect to her degree of familiarity in operating the third vehicle 154 in a regime with left-hand traffic. The vehicle 200 (which can be the third vehicle 154) can: (1) obtain, via the sensor 222 at a time in which the third vehicle 154 is being operated on the left side of the road, the information indicative of the cognitive state of Dorit and (2) determine, based on the information indicative of the cognitive state of Dorit, the degree of familiarity of Dorit in operating the third vehicle 154 on the left side of the road.

Returning to FIG. 3, for example, the communications module 306 can include instructions that function to control the processor 302 to obtain information about a direction of the turn.

In an implementation, the system 300 can be configured to be coupled to one or more turn signal devices. The one or more turn signal devices can be communicably coupled to the processor 302. For example, the one or more turn signal devices can be the left turn signal device 232, the right turn signal device 234, or both, illustrated in FIG. 2. The instructions to obtain the information about the direction of the turn can include instructions to receive, from the turn signal device of the vehicle, the information about the direction of the turn. With reference to FIGS. 1 and 2, for example, the processor 202 of the vehicle 200 (which can be the first vehicle 150) can receive, from the right turn signal device 234, information that indicates the direction of the turn is to the right.

Returning to FIG. 3, additionally or alternatively, in another implementation, the system 300 can be configured to be coupled to a navigation system of the vehicle. The navigation system navigation system can be communicably coupled to the processor 302. The navigation system can be configured to determine, for the vehicle, a route from an origination location to a destination location. For example, the navigation system can be the navigation system 236 illustrated in FIG. 2. The instructions to obtain the information about the direction of the turn can include instructions to receive, from the navigation system of the vehicle, the information about the direction of the turn. With reference to FIGS. 1 and 2, for example, the processor 202 of the vehicle 200 (which can be the first vehicle 150) can receive, from the navigation system 236, information that indicates the direction of the turn is to the right.

Returning to FIG. 3, additionally or alternatively, in yet another implementation, the instructions to obtain the information about the direction of the turn can include instructions to: (1) receive, from a roadside unit, information that indicates that the vehicle is within a threshold distance of an intersection, (2) determine information about one or more roads associated with the intersection, and (3) determine, based on the information about the one or more roads associated with the intersection, the information about the direction of the turn. The information about the one or more roads associated with the intersection can include information about one or more directions of traffic flow in one or more lanes of the one or more roads associated with the intersection. For example, the roadside unit can be the roadside unit 138 illustrated in FIG. 1.

With reference to FIGS. 1 and 2, for example, the processor 202 of the vehicle 200 (which can be the fifth vehicle 158) can: (1) receive (e.g., via the communications device 206), from the roadside unit 138 (e.g., via the communications device 140), information that indicates that the vehicle 200 is within ten meters (e.g., the threshold distance) of the second intersection 136, (2) determine that the second intersection 136 is a T-junction, formed by Buckingham Street 102 and Saxon Lane 106, at which Buckingham Street 102 ends and that Saxon Lane 106 has only lane #1 128, which is only for southbound traffic, and (3) determine, based on the second intersection 136 being a T-junction, formed by Buckingham Street 102 and Saxon Lane 106, at which Buckingham Street 102 ends Saxon Lane 106 having only lane #1 128, which is only for southbound traffic, information that indicates the direction of the turn is to the right.

Returning to FIG. 3, for example, the controller module 308 can include instructions that function to control the processor 302 to cause, in response to the degree of familiarity being less than a threshold and based on the information about the direction, a visual aid to be possibly presented to aid the individual to cause the vehicle to make the turn correctly.

In an implementation, the instructions to cause the visual aid to be possibly presented can include instructions to cause a signal to be sent to a controller of a headlamp system of the vehicle. The headlamp system can include a digital micromirror device. The digital micromirror device can have an array of micromirror elements. The controller can be configured to control a position of a micromirror element of the array so that, in response to having the micromirror element illuminated by a light, a reflection of the light from the micromirror element can form a pixel of an image projected in front of the vehicle. The image can include the visual aid. With reference to FIG. 2, for example, the headlamp system of the vehicle can be the headlamp system 238 of the vehicle 200 and the image can be the image 252. The image 252 can include the visual aid 292.

Returning to FIG. 3, additionally or alternatively, in another implementation, the instructions to cause the visual aid to be possibly presented can include instructions to cause a signal to be sent to a controller of a headlamp system of the vehicle. The headlamp system can include a spatial light modulator. The spatial light modulator can have an array of translucent elements. The controller can be configured to control a degree of translucence of a translucent element of the array so that, in response to having the translucent element illuminated by a light, a portion of the light, determined by the degree of translucence, passing through the translucent element can form a pixel of an image projected in front of the vehicle. The image can include the visual aid. With reference to FIG. 2, for example, the headlamp system of the vehicle can be the headlamp system 254 of the vehicle 200 and the image can be the image 268. The image 268 can include the visual aid 292.

Returning to FIG. 3, additionally or alternatively, in yet another implementation, the instructions to cause the visual aid to be possibly presented can include instructions to cause a signal to be sent to a controller of a head-up display system of the vehicle. The head-up display system can include a projector. The controller can be configured to control an appearance of an image to be projected by the projector to a display region. The display region can be one or more of a combiner of the head-up display system, a portion of a windshield of the vehicle, a volume of space in front of the individual operating the vehicle, or the like. The image can have one or more of a two-dimensional form or a three-dimensional form. The image can include the visual aid. With reference to FIG. 2, for example, the head-up display system of the vehicle can be the head-up display system 270 of the vehicle 200 and the image can be the image 276. The image 276 can include the visual aid 292.

For example, the visual aid can include an arrow pointed in the direction of the turn, an animation of a car making the turn correctly, or the like. For example, the visual aid 292, included in one or more of the image 252 or the image 268, can include an arrow 294 pointed in the direction of the turn. Additionally or alternatively, for example, the visual aid 292 included in the image 276 can include an animation 296 of a car making the turn correctly. For example, the instructions to cause the animation of the car making the turn correctly to be possibly presented can include instructions to cause the animation of the car making the turn correctly to be possibly presented in a continuous loop. For example, the animation 296 can include three illustrations of the car at different positions in a sequence as the car makes the turn correctly: 1, 2, 3. The instructions to cause the animation 296 can include instructions to cause the sequence to be possibly presented in a continuous loop.

For example, the instructions to cause the visual aid to be possibly presented can include instructions to cause the visual aid to be possibly presented one or more of: (1) at a time within a threshold duration of time before a commencement of causing the vehicle to make the turn or (2) concurrent with a duration of time of the causing the vehicle to make the turn.

Returning to FIG. 3, in an implementation, the system 300 can further include the communications device 310. The communications module 306 can further include instructions to: (1) receive, via the communications device 310, a first communication from another vehicle in a vicinity of the vehicle and (2) cause, via the communications device 310, a second communication to be transmitted to the other vehicle. The first communication can include information that indicates that the other vehicle is operating a system configured to cause a visual aid for the other vehicle to be presented to aid an individual operating the other vehicle to make a turn of the other vehicle correctly. The second communication can include information about an appearance of the visual aid for the vehicle. For example, the information about the appearance of the visual aid for the vehicle can include one or more of information about a color of the visual aid, a shape of the visual aid, a pattern of the visual aid, or the like. Additionally or alternatively, for example, the first communication can further include information about an appearance of the visual aid for the other vehicle and the communications module 306 can further include instructions to cause, in response to the information about the appearance of the visual aid for the other vehicle, a change to the appearance of the visual aid for the vehicle.

With reference to FIGS. 1 and 2, for example, the vehicle 200 (which can be the second vehicle 152) can receive, via the communications device 206, the first communication from the first vehicle 150 in the vicinity of the second vehicle 152. The first communication can include the information that indicates that the first vehicle 150 is operating the system configured to cause the visual aid for the first vehicle 150 to be presented to aid the individual operating the first vehicle 150 (i.e., Audrey) to make the turn of the first vehicle 150 correctly. For example, the first communication can further include information that the visual aid for the first vehicle 150 is an arrow 160 having a first color (e.g., red). The vehicle 200 (which can be the second vehicle 152) can cause, via the communications device 206, the second communication to be transmitted to the first vehicle 150. The second communication can include information that the visual aid for the second vehicle 152 is an arrow 162 having the first color (e.g., red). For example, the second vehicle 152 can cause, in response to the information that the visual aid for the first vehicle 150 is the arrow 160 having the first color, the change to the appearance of the visual aid for the second vehicle 152 to be the arrow 162 having a second color (e.g., blue).

Returning to FIG. 3, in an implementation: (1) the communications module 306 can further include instructions to obtain information about an existence of a condition in which a probability that the presentation of the visual aid will be detrimental to an operation of the vehicle is greater than a probability threshold and (2) the instructions to cause the visual aid to be possibly presented can include instructions to refrain, in response to a determination of the existence of the condition, from causing the visual aid to be presented.

For example, the condition can include a distance between the vehicle and a preceding vehicle being less than a threshold distance. For example, the system 300 can further include the sensor 312. For example, the sensor 312 can be the sensor 290 (e.g., a ranging device) illustrated in FIG. 2. The instructions to obtain the information about the existence of the condition can include instructions to receive, from the sensor 312, information about the distance between the vehicle and the preceding vehicle.

With reference to FIGS. 1 and 2, for example, the vehicle 200 (which can be the third vehicle 154) can receive, from the sensor 290, the information that the distance between the third vehicle 154 and the second vehicle 152 is five meters. For example, if the threshold distance is six meters, then the condition, the distance between the third vehicle 154 and the second vehicle 152 (i.e., five meters) being less than the threshold distance (i.e., six meters), exists. The vehicle 200 can refrain, in response to the determination of the existence of the condition, from causing the visual aid to be presented.

Returning to FIG. 3, additionally or alternatively, for example, the condition can include the direction of the turn being an only possible direction of the turn. The instructions to obtain the information about the existence of the condition can include instructions to obtain additional information about the direction of the turn. For example, the system 300 can further include the data store 314. For example, data store 314 can be the data store 218 illustrated in FIG. 2. The instructions to obtain the additional information can include instructions to retrieve, from the data store 314, map data that include the additional information. Additionally or alternatively, for example, the system 300 can further include the communications device 310. For example, the communications device 310 can be the communications device 206 illustrated in FIG. 2. The instructions to obtain the additional information can include instructions to receive, via the communications device 310 and from a cloud computing platform of a system configured to maintain a map, a communication that includes the additional information. The additional information can include one or more of: (1) a determination of a current location of the vehicle on a first road, (2) a direction of travel of the vehicle, (3) an identification of an intersection, of the first road and a second road, at which the turn onto the second road is to be made, or (4) the like.

With reference to FIGS. 1 and 2, for example, the vehicle 200 (which can be the fifth vehicle 158) can obtain the additional information about the direction of the turn. The additional information can include that: (1) the current location of the fifth vehicle 158 is in the lane #1 108 about five meters west of the second intersection 136, (2) the direction of travel of the fifth vehicle 158 is eastbound, and (3) the second intersection 136 is a T-junction, formed by Buckingham Street 102 and Saxon Lane 106, at which Buckingham Street 102 ends and Saxon Lane 106 has only lane #1 128, which is only for southbound traffic. For example, if: (1) the current location of the fifth vehicle 158 is in the lane #1 108 about five meters west of the second intersection 136, (2) the direction of travel of the fifth vehicle 158 is eastbound, and (3) the second intersection 136 is a T-junction, formed by Buckingham Street 102 and Saxon Lane 106, at which Buckingham Street 102 ends and Saxon Lane 106 has only lane #1 128, which is only for southbound traffic, then because the direction of the turn is to the right, which is an only possible direction of the turn, the condition exists. The vehicle 200 can refrain, in response to the determination of the existence of the condition, from causing the visual aid to be presented.

Figure 4:
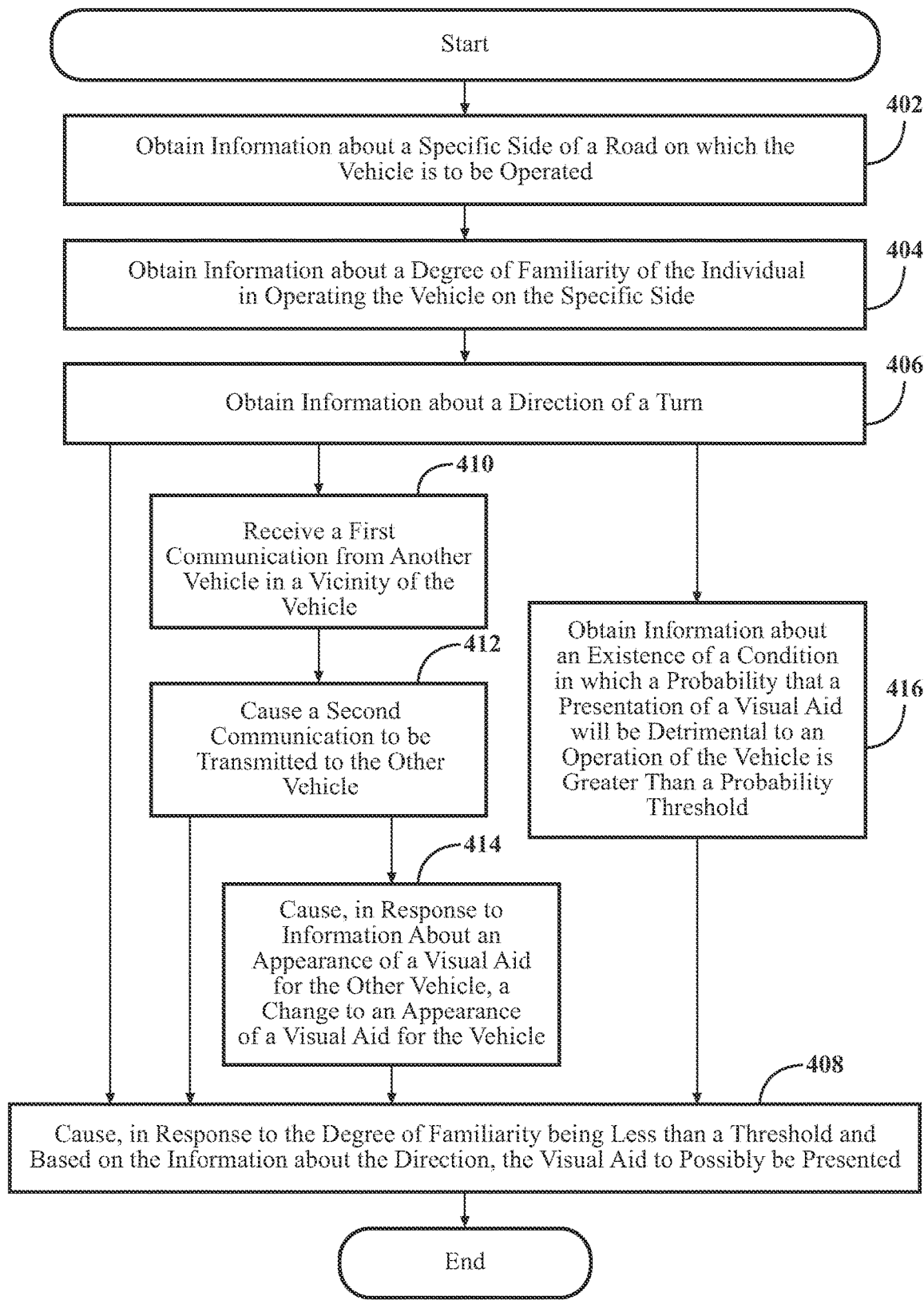
FIG. 4 includes a flow diagram that illustrates an example of a method that is associated with aiding an individual to cause a vehicle to make a turn correctly, according to the disclosed technologies.

FIG. 4 includes a flow diagram that illustrates an example of a method 400 that is associated with aiding an individual to cause a vehicle to make a turn correctly, according to the disclosed technologies. Although the method 400 is described in combination with the system 300 illustrated in FIG. 3, one of skill in the art understands, in light of the description herein, that the method 400 is not limited to being implemented by the system 300 illustrated in FIG. 3. Rather, the system 300 illustrated in FIG. 3 is an example of a system that may be used to implement the method 400. Additionally, although the method 400 is illustrated as a generally serial process, various aspects of the method 400 may be able to be executed in parallel.

In FIG. 4, in the method 400, at an operation 402, for example, the communications module 306 can obtain information about a specific side of a road on which the vehicle is to be operated.

In an implementation, the communications module 306 can obtain the information about the specific side of the road on which the vehicle is to be operated by receiving, via the communications device 310, a signal that includes the information about the specific side of the road on which the vehicle is to be operated.

Additionally or alternatively, in another implementation, the communications module 306 can obtain the information about the specific side of the road on which the vehicle is to be operated by: (1) determining, via the sensor 312, a current location of the vehicle and (2) determining, based on the current location of the vehicle, the specific side of the road on which the vehicle is to be operated.

Additionally or alternatively, in yet another implementation, the communications module 306 can obtain the information about the specific side of the road on which the vehicle is to be operated by: (1) determining, via the sensor 312, a lane marking that indicates the specific side of the road on which the vehicle is to be operated and (2) determining, based on the lane marking, the specific side of the road on which the vehicle is to be operated.

Additionally or alternatively, in still another implementation, the communications module 306 can obtain the information about the specific side of the road on which the vehicle is to be operated by: (1) determining a side of the vehicle at which a steering operator interface of the vehicle is disposed and (2) determining, based on the side of the vehicle at which the steering operator interface is disposed, the specific side of the road on which the vehicle is to be operated.

At an operation 404, for example, the communications module 306 can obtain information about a degree of familiarity of the individual in operating the vehicle on the specific side.

In an implementation, the communications module 306 can obtain the information about the degree of familiarity of the individual in operating the vehicle on the specific side by receiving, via the communications device 310, a signal that includes the information about the degree of familiarity of the individual in operating the vehicle on the specific side.

Additionally or alternatively, in another implementation, the communications module 306 can obtain the information about the degree of familiarity of the individual in operating the vehicle on the specific side by receiving, via a user interface, a signal that includes the information about the degree of familiarity of the individual in operating the vehicle on the specific side.

Additionally or alternatively, in yet another implementation, the communications module 306 can obtain the information about the degree of familiarity of the individual in operating the vehicle on the specific side by: (1) obtaining, via the sensor 312, information indicative of a cognitive state of the individual and (2) determining, based on the information indicative of the cognitive state of the individual, the degree of familiarity of the individual in operating the vehicle on the specific side.

At an operation 406, for example, the communications module 306 can obtain information about a direction of the turn.

In an implementation, the communications module 306 can obtain the information about the direction of the turn by receiving, from a turn signal device of the vehicle, the information about the direction of the turn.

Additionally or alternatively, in another implementation, the communications module 306 can obtain the information about the direction of the turn by receiving, from a navigation system of the vehicle, the information about the direction of the turn.

Additionally or alternatively, in yet another implementation, the communications module 306 can obtain the information about the direction of the turn by: (1) receiving, from a roadside unit, information that indicates that the vehicle is within a threshold distance of an intersection, (2) determining information about one or more roads associated with the intersection, and (3) determining, based on the information about the one or more roads associated with the intersection, the information about the direction of the turn. The information about the one or more roads associated with the intersection can include information about one or more directions of traffic flow in one or more lanes of the one or more roads associated with the intersection.

At an operation 408, for example, the controller module 308 can cause, in response to the degree of familiarity being less than a threshold and based on the information about the direction, a visual aid to be possibly presented to aid the individual to cause the vehicle to make the turn correctly.

In an implementation, the controller module 308 can cause the visual aid to be possibly presented by causing a signal to be sent to a controller of a headlamp system of the vehicle. The headlamp system can include a digital micromirror device. The digital micromirror device can have an array of micromirror elements. The controller can be configured to control a position of a micromirror element of the array so that, in response to having the micromirror element illuminated by a light, a reflection of the light from the micromirror element can form a pixel of an image projected in front of the vehicle. The image can include the visual aid.

Additionally or alternatively, in another implementation, the controller module 308 can cause the visual aid to be possibly presented by causing a signal to be sent to a controller of a headlamp system of the vehicle. The headlamp system can include a spatial light modulator. The spatial light modulator can have an array of translucent elements. The controller can be configured to control a degree of translucence of a translucent element of the array so that, in response to having the translucent element illuminated by a light, a portion of the light, determined by the degree of translucence, passing through the translucent element can form a pixel of an image projected in front of the vehicle. The image can include the visual aid.

Additionally or alternatively, in yet another implementation, the controller module 308 can cause the visual aid to be possibly presented by causing a signal to be sent to a controller of a head-up display system of the vehicle. The head-up display system can include a projector. The controller can be configured to control an appearance of an image to be projected by the projector to a display region. The display region can be one or more of a combiner of the head-up display system, a portion of a windshield of the vehicle, a volume of space in front of the individual operating the vehicle, or the like. The image can have one or more of a two-dimensional form or a three-dimensional form. The image can include the visual aid.

For example, the visual aid can include an arrow pointed in the direction of the turn, an animation of a car making the turn correctly, or the like.

For example, the controller module 308 can cause the animation of the car making the turn correctly to be possibly presented in a continuous loop.

For example, the controller module 308 can cause the visual aid to be possibly presented one or more of: (1) at a time within a threshold duration of time before a commencement of causing the vehicle to make the turn or (2) concurrent with a duration of time of the causing the vehicle to make the turn.

In an implementation, at an operation 410, the communications module 306 can receive, via the communications device 310, a first communication from another vehicle in a vicinity of the vehicle. The first communication can include information that indicates that the other vehicle is operating a system configured to cause a visual aid for the other vehicle to be presented to aid an individual operating the other vehicle to make a turn of the other vehicle correctly.

In this implementation, at an operation 412, the communications module 306 can cause, via the communications device 310, a second communication to be transmitted to the other vehicle. The second communication can include information about an appearance of the visual aid for the vehicle. For example, the information about the appearance of the visual aid for the vehicle can include one or more of information about a color of the visual aid, a shape of the visual aid, a pattern of the visual aid, or the like.

In this implementation, additionally or alternatively, for example, the first communication can further include information about an appearance of the visual aid for the other vehicle. At an operation 414, the communications module 306 can cause, in response to the information about the appearance of the visual aid for the other vehicle, a change to the appearance of the visual aid for the vehicle.

In an implementation, at an operation 416, the communications module 306 can obtain information about an existence of a condition in which a probability that the presentation of the visual aid will be detrimental to an operation of the vehicle is greater than a probability threshold. In this implementation, in the operation 408, the controller module 308 can refrain, in response to a determination of the existence of the condition, from causing the visual aid to be presented.

For example, the condition can include a distance between the vehicle and a preceding vehicle being less than a threshold distance.

Additionally or alternatively, for example, the condition can include the direction of the turn being an only possible direction of the turn. For example, the communications module 306 can obtain the information about the existence of the condition by obtaining additional information about the direction of the turn. For example, the communications module 306 can obtain the additional information by retrieving, from the data store 314, map data that include the additional information. Additionally or alternatively, for example, the communications module 306 can obtain the additional information by receiving, via the communications device 310 and from a cloud computing platform of a system configured to maintain a map, a communication that includes the additional information. The additional information can include one or more of: (1) a determination of a current location of the vehicle on a first road, (2) a direction of travel of the vehicle, (3) an identification of an intersection, of the first road and a second road, at which the turn onto the second road is to be made, or (4) the like.

Figure 5:
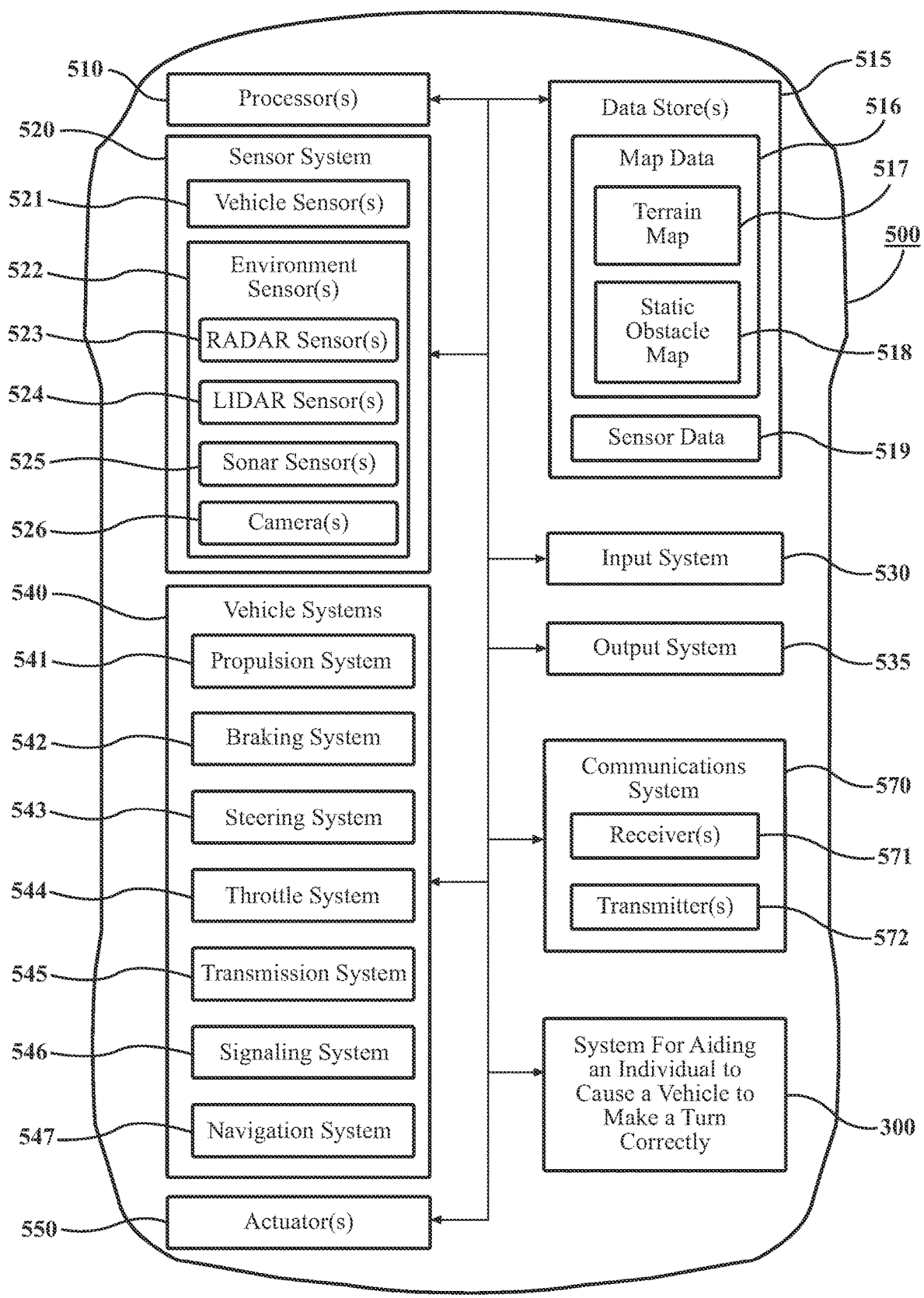
FIG. 5 includes a block diagram that illustrates an example of elements disposed on a vehicle, according to the disclosed technologies.

FIG. 5 includes a block diagram that illustrates an example of elements disposed on a vehicle 500, according to the disclosed technologies. As used herein, a "vehicle" can be any form of powered transport. In one or more implementations, the vehicle 500 can be an automobile. While arrangements described herein are with respect to automobiles, one of skill in the art understands, in light of the description herein, that embodiments are not limited to automobiles. For example, functions and/or operations of one or more of the first vehicle 150 (illustrated in FIG. 1), the second vehicle 152 (illustrated in FIG. 1), the third vehicle 154 (illustrated in FIG. 1), the fourth vehicle 156 (illustrated in FIG. 1), the fifth vehicle 158 (illustrated in FIG. 1), or the vehicle 200 (illustrated in FIG. 2) can be realized by the vehicle 500.

The vehicle 500 can include various elements. The vehicle 500 can have any combination of the various elements illustrated in FIG. 5. In various embodiments, it may not be necessary for the vehicle 500 to include all of the elements illustrated in FIG. 5. Furthermore, the vehicle 500 can have elements in addition to those illustrated in FIG. 5. While the various elements are illustrated in FIG. 5 as being located within the vehicle 500, one or more of these elements can be located external to the vehicle 500. Furthermore, the elements illustrated may be physically separated by large distances. For example, as described, one or more components of the disclosed system can be implemented within the vehicle 500 while other components of the system can be implemented within a cloud-computing environment, as described below. For example, the elements can include one or more processors 510, one or more data stores 515, a sensor system 520, an input system 530, an output system 535, vehicle systems 540, one or more actuators 550, a communications system 570, and the system 300 for aiding an individual to cause a vehicle to make a turn correctly.

In one or more arrangements, the one or more processors 510 can be a main processor of the vehicle 500. For example, the one or more processors 510 can be an electronic control unit (ECU). For example, functions and/or operations of one or more of the processor 202 (illustrated in FIG. 2), the controller 240 (illustrated in FIG. 2), the controller 256 (illustrated in FIG. 2), the controller 272 (illustrated in FIG. 2), or the processor 302 (illustrated in FIG. 3) can be realized by the one or more processors 510.

The one or more data stores 515 can store, for example, one or more types of data. The one or more data stores 515 can include volatile memory and/or non-volatile memory. For example, functions and/or operations of one or more of the memory 204 (illustrated in FIG. 2), the data store 218 (illustrated in FIG. 2), the memory 304 (illustrated in FIG. 3), or the data store 314 (illustrated in FIG. 3) can be realized by the one or more data stores 515. Examples of suitable memory for the one or more data stores 515 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 515 can be a component of the one or more processors 510. Additionally or alternatively, the one or more data stores 515 can be operatively connected to the one or more processors 510 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 515 can store map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed.

In one or more arrangements, the map data 516 can include one or more terrain maps 517. The one or more terrain maps 517 can include information about the ground, terrain, roads, surfaces, and/or other features of one or more geographic areas. The one or more terrain maps 517 can include elevation data of the one or more geographic areas. The map data 516 can be high quality and/or highly detailed. The one or more terrain maps 517 can define one or more ground surfaces, which can include paved roads, unpaved roads, land, and other things that define a ground surface.

In one or more arrangements, the map data 516 can include one or more static obstacle maps 518. The one or more static obstacle maps 518 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 518 can have location data, size data, dimension data, material data, and/or other data associated with them. The one or more static obstacle maps 518 can include measurements, dimensions, distances, and/or information for one or more static obstacles. The one or more static obstacle maps 518 can be high quality and/or highly detailed. The one or more static obstacle maps 518 can be updated to reflect changes within a mapped area.

In one or more arrangements, the one or more data stores 515 can store sensor data 519. As used herein, "sensor data" can refer to any information about the sensors with which the vehicle 500 can be equipped including the capabilities of and other information about such sensors. The sensor data 519 can relate to one or more sensors of the sensor system 520. For example, in one or more arrangements, the sensor data 519 can include information about one or more lidar sensors 524 of the sensor system 520.

In some arrangements, at least a portion of the map data 516 and/or the sensor data 519 can be located in one or more data stores 515 that are located onboard the vehicle 500. Additionally or alternatively, at least a portion of the map data 516 and/or the sensor data 519 can be located in one or more data stores 515 that are located remotely from the vehicle 500.

The sensor system 520 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the one or more processors 510, the one or more data stores 515, and/or another element of the vehicle 500 (including any of the elements illustrated in FIG. 5). The sensor system 520 can acquire data of at least a portion of the external environment of the vehicle 500 (e.g., nearby vehicles). The sensor system 520 can include any suitable type of sensor. Various examples of different types of sensors are described herein. However, one of skill in the art understands that the embodiments are not limited to the particular sensors described herein.

The sensor system 520 can include one or more vehicle sensors 521. The one or more vehicle sensors 521 can detect, determine, and/or sense information about the vehicle 500 itself. In one or more arrangements, the one or more vehicle sensors 521 can be configured to detect and/or sense position and orientation changes of the vehicle 500 such as, for example, based on inertial acceleration. In one or more arrangements, the one or more vehicle sensors 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The one or more vehicle sensors 521 can be configured to detect and/or sense one or more characteristics of the vehicle 500. In one or more arrangements, the one or more vehicle sensors 521 can include a speedometer to determine a current speed of the vehicle 500. For example, functions and/or operations of one or more of the sensor 208 (e.g., a Global Navigation Satellite System (GNSS) sensor) (illustrated in FIG. 2), the sensor 290 (e.g., a ranging device) (illustrated in FIG. 2), or the sensor 312 (illustrated in FIG. 3) can be realized by the one or more vehicle sensors 521.

Additionally or alternatively, the sensor system 520 can include one or more environment sensors 522 configured to acquire and/or sense driving environment data. As used herein, "driving environment data" can include data or information about the external environment in which a vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify, and/or sense other things in the external environment of the vehicle 500 such as, for example, lane markers, signs, traffic lights, traffic signs, lane lines, crosswalks, curbs proximate the vehicle 500, off-road objects, etc.

Various examples of sensors of the sensor system 520 are described herein. The example sensors may be part of the one or more vehicle sensors 521 and/or the one or more environment sensors 522. However, one of skill in the art understands that the embodiments are not limited to the particular sensors described.

In one or more arrangements, the one or more environment sensors 522 can include one or more radar sensors 523, one or more lidar sensors 524, one or more sonar sensors 525, and/or one more cameras 526. In one or more arrangements, the one or more cameras 526 can be one or more high dynamic range (HDR) cameras or one or more infrared (IR) cameras. For example, the one or more cameras 526 can be used to record a reality of a state of an item of information that can appear in the digital map. For example, functions and/or operations of one or more of the sensor 210 (e.g., a side-facing camera) (illustrated in FIG. 2), the sensor 222 (e.g., the gaze-tracking system 224 (illustrated in FIG. 2), the still image camera 226 (illustrated in FIG. 2), the video camera 228 (illustrated in FIG. 2), or the infrared camera 230 (illustrated in FIG. 2)) (illustrated in FIG. 2), or the sensor 312 (illustrated in FIG. 3) can be realized by the one or more cameras 526.

The input system 530 can include any device, component, system, element, arrangement, or groups thereof that enable information/data to be entered into a machine. The input system 530 can receive an input from a vehicle passenger (e.g., a driver or a passenger). The output system 535 can include any device, component, system, element, arrangement, or groups thereof that enable information/data to be presented to a vehicle passenger (e.g., a driver or a passenger). For example, functions and/or operations of the user interface 220 (illustrated in FIG. 2) can be realized by the input system 530.

Various examples of the one or more vehicle systems 540 are illustrated in FIG. 5. However, one of skill in the art understands that the vehicle 500 can include more, fewer, or different vehicle systems. Although particular vehicle systems can be separately defined, each or any of the systems or portions thereof may be otherwise combined or segregated via hardware and/or software within the vehicle 500. For example, the one or more vehicle systems 540 can include a propulsion system 541, a braking system 542, a steering system 543, a throttle system 544, a transmission system 545, a signaling system 546, and/or the navigation system 547. Each of these systems can include one or more devices, components, and/or a combination thereof, now known or later developed. For example, functions and/or operations of the steering operator interface 212 (illustrated in FIG. 2) can be realized by the steering system 543.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, a geolocation system, and/or a combination thereof. For example, functions and/or operations of the navigation system 236 (illustrated in FIG. 2) can be realized by the navigation system 547.

The one or more actuators 550 can be any element or combination of elements operable to modify, adjust, and/or alter one or more of the vehicle systems 540 or components thereof responsive to receiving signals or other inputs from the one or more processors 510. Any suitable actuator can be used. For example, the one or more actuators 550 can include motors, pneumatic actuators, hydraulic pistons, relays, solenoids, and/or piezoelectric actuators.

The one or more processors 510 can be operatively connected to communicate with the various vehicle systems 540 and/or individual components thereof. For example, the one or more processors 510 can be in communication to send and/or receive information from the various vehicle systems 540 to control the movement, speed, maneuvering, heading, direction, etc. of the vehicle 500. The one or more processors 510 may control some or all of these vehicle systems 540.

The one or more processors 510 may be operable to control the navigation and/or maneuvering of the vehicle 500 by controlling one or more of the vehicle systems 540 and/or components thereof. The one or more processors 510 can cause the vehicle 500 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing"

can mean to make, force, compel, direct, command, instruct, and/or enable an event or action to occur or at least be in a state where such event or action may occur, either in a direct or indirect manner.

The communications system 570 can include one or more receivers 571 and/or one or more transmitters 572. The communications system 570 can receive and transmit one or more messages through one or more wireless communications channels. For example, functions and/or operations of one or more of the communications device 206 (illustrated in FIG. 2) or the communications device 310 (illustrated in FIG. 3) can be realized by the communications system 570. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 570 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

Moreover, the one or more processors 510, the one or more data stores 515, and the communications system 570 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 500 can include one or more modules, at least some of which are described herein. The modules can be implemented as computer-readable program code that, when executed by the one or more processors 510, implement one or more of the various processes described herein. One or more of the modules can be a component of the one or more processors 510. Additionally or alternatively, one or more of the modules can be executed on and/or distributed among other processing systems to which the one or more processors 510 can be operatively connected. The modules can include instructions (e.g., program logic) executable by the one or more processors 510. Additionally or alternatively, the one or more data store 515 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing:
a communications module including instructions that, when executed by the processor, cause the processor to:
obtain information about a specific side of a road on which a vehicle is to be operated;
obtain information about a degree of familiarity of an individual in operating the vehicle on the specific side; and
obtain information about a direction of a turn; and
a controller module including instructions that, when executed by the processor, cause the processor to cause, in response to the degree of familiarity being less than a threshold and based on the information about the direction, a visual aid to be capable of being presented to aid the individual to cause the vehicle to make the turn correctly.

2. The system of claim 1, wherein the instructions to obtain the information about the specific side of the road on which the vehicle is to be operated include instructions to receive, via a communications device, a signal that includes the information about the specific side of the road on which the vehicle is to be operated.

3. The system of claim 1, wherein the instructions to obtain the information about the specific side of the road on which the vehicle is to be operated include instructions to:
determine, via a sensor, a current location of the vehicle; and
determine, based on the current location of the vehicle, the specific side of the road on which the vehicle is to be operated.

4. The system of claim 1, wherein the instructions to obtain the information about the specific side of the road on which the vehicle is to be operated include instructions to:
determine a side of the vehicle at which a steering operator interface of the vehicle is disposed; and
determine, based on the side of the vehicle at which the steering operator interface is disposed, the specific side of the road on which the vehicle is to be operated.

5. The system of claim 1, wherein the instructions to obtain the information about the degree of familiarity of the individual in operating the vehicle on the specific side include instructions to receive, via a communications device, a signal that includes the information about the degree of familiarity of the individual in operating the vehicle on the specific side.

6. The system of claim 1, wherein the instructions to obtain the information about the degree of familiarity of the individual in operating the vehicle on the specific side include instructions to receive, via an interface of the vehicle, a signal that includes the information about the degree of familiarity of the individual in operating the vehicle on the specific side.

7. The system of claim 1, wherein the instructions to obtain the information about the degree of familiarity of the individual in operating the vehicle on the specific side include instructions to:
obtain, via a sensor, information indicative of a cognitive state of the individual, the information indicative of the cognitive state of the individual produced at a time in which the vehicle was being operated on the specific side of the road; and
determine, based on the information indicative of the cognitive state of the individual, the degree of familiarity of the individual in operating the vehicle on the specific side.

8. The system of claim 7, wherein the sensor comprises at least one of a gaze-tracking system, a still image camera, a video camera, or an infrared camera.

9. The system of claim 1, wherein the instructions to obtain the information about the direction of the turn include instructions to receive, from a turn signal device of the vehicle, the information about the direction of the turn.

10. The system of claim 1, wherein the instructions to obtain the information about the direction of the turn include instructions to receive, from a navigation system of the vehicle, the information about the direction of the turn.

11. The system of claim 1, wherein the instructions to obtain the information about the direction of the turn include instructions to:
receive, from a roadside unit, information that indicates that the vehicle is within a threshold distance of an intersection;
determine information about at least one road associated with the intersection, wherein the information about the at least one road associated with the intersection includes information about at least one direction of traffic flow in at least one lane of the at least one road associated with the intersection; and
determine, based on the information about the at least one road associated with the intersection, the information about the direction of the turn.

12. The system of claim 1, wherein the instructions to cause the visual aid to be capable of being presented include instructions to cause a signal to be sent to a controller of a headlamp system of the vehicle, wherein the headlamp system includes a digital micromirror device, the digital micromirror device having an array of micromirror elements, the controller being configured to control a position of a micromirror element of the array so that, in response to having the micromirror element illuminated by a light, a reflection of the light from the micromirror element forms a pixel of an image projected in front of the vehicle, wherein the image comprises the visual aid.

13. The system of claim 1, wherein the instructions to cause the visual aid to be capable of being presented include instructions to cause a signal to be sent to a controller of a headlamp system of the vehicle, wherein the headlamp system includes a spatial light modulator, the spatial light modulator having an array of translucent elements, the controller being configured to control a degree of translucence of a translucent element of the array so that, in response to having the translucent element illuminated by a light, a portion of the light, determined by the degree of translucence, passing through the translucent element forms a pixel of an image projected in front of the vehicle, wherein the image comprises the visual aid.

14. The system of claim 1, wherein the instructions to cause the visual aid to be capable of being presented include instructions to cause a signal to be sent to a controller of a head-up display system of the vehicle, wherein the head-up display system includes a projector, the controller being configured to control an appearance of an image to be projected by the projector to a display region, the display region being at least one of a combiner of the head-up display system, a portion of a windshield of the vehicle, or a volume of space in front of the individual operating the vehicle, wherein the image has at least one of a two-dimensional form or a three-dimensional form, wherein the image comprises the visual aid.

15. The system of claim 1, wherein the communications module further includes instructions to:
receive, via a communications device, a first communication from another vehicle in a vicinity of the vehicle, wherein the first communication includes information that indicates that the other vehicle is operating a system configured to cause a visual aid for the other vehicle to be presented to aid an individual operating the other vehicle to make a turn of the other vehicle correctly; and
cause, via the communications device, a second communication to be transmitted to the other vehicle, wherein the second communication includes information about an appearance of the visual aid for the vehicle.

16. The system of claim 1, wherein:
the communications module further includes instructions to obtain information about an existence of a condition in which a probability that the presentation of the visual aid will be detrimental to an operation of the vehicle is greater than a probability threshold; and
the instructions to cause the visual aid to be capable of being presented include instructions to refrain, in response to a determination of the existence of the condition, from causing the visual aid to be presented.

17. A method, comprising:
obtaining, by a processor, information about a specific side of a road on which a vehicle is to be operated;
obtaining, by the processor, information about a degree of familiarity of an individual in operating the vehicle on the specific side;
obtaining, by the processor, information about a direction of a turn; and
causing, by the processor, in response to the degree of familiarity being less than a threshold, and based on the information about the direction, a visual aid to be capable of being presented to aid the individual to cause the vehicle to make the turn correctly.

18. The method of claim 17, wherein the visual aid comprises at least one of:
an arrow pointed in the direction of the turn, or
an animation of a car making the turn correctly.

19. The method of claim 17, wherein the causing the visual aid to be capable of being presented comprises causing the visual aid to be capable of being presented at least one of:
at a time within a threshold duration of time before a commencement of causing the vehicle to make the turn, or
concurrent with a duration of time of the causing the vehicle to make the turn.

20. A non-transitory computer-readable medium for aiding an individual to cause a vehicle to make a turn correctly, the non-transitory computer-readable medium including instructions that, when executed by one or more processors, cause the one or more processors to:
obtain information about a specific side of a road on which a vehicle is to be operated;
obtain information about a degree of familiarity of an individual in operating the vehicle on the specific side;
obtain information about a direction of a turn; and
cause, in response to the degree of familiarity being less than a threshold and based on the information about the direction, a visual aid to be capable of being presented to aid the individual to cause the vehicle to make the turn correctly.

* * * * *